United States Patent
Kondou et al.

(10) Patent No.: US 10,309,422 B2
(45) Date of Patent: Jun. 4, 2019

(54) BLOWER

(71) Applicant: DENSO CORPORATION, Kariya, Aichi-pref. (JP)

(72) Inventors: Toshikatsu Kondou, Kariya (JP); Masashi Matsukawa, Kariya (JP); Youhei Kamiya, Kariya (JP); Masaru Kamiya, Kariya (JP); Takeshi Miyamoto, Kariya (JP); Isao Kondoh, Kariya (JP); Takashi Ito, Kariya (JP); Kazuhiro Takeuchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 355 days.

(21) Appl. No.: 15/112,706

(22) PCT Filed: Feb. 20, 2015

(86) PCT No.: PCT/JP2015/000805
§ 371 (c)(1),
(2) Date: Jul. 20, 2016

(87) PCT Pub. No.: WO2015/125485
PCT Pub. Date: Aug. 27, 2015

(65) Prior Publication Data
US 2016/0341220 A1    Nov. 24, 2016

(30) Foreign Application Priority Data

Feb. 21, 2014    (JP) ................................. 2014-031516

(51) Int. Cl.
F04D 29/52    (2006.01)
F04D 29/66    (2006.01)
(Continued)

(52) U.S. Cl.
CPC ....... *F04D 29/667* (2013.01); *B60H 1/00464* (2013.01); *F04D 19/002* (2013.01);
(Continued)

(58) Field of Classification Search
None
See application file for complete search history.

(56) References Cited

U.S. PATENT DOCUMENTS 2,030,993 A * 2/1936 Langenkamp ........ F04D 29/646
415/147
4,685,513 A * 8/1987 Longhouse ............... F01P 5/06
123/41.49
(Continued)

FOREIGN PATENT DOCUMENTS

JP    2008057480 A    3/2008
JP    2010132183 A    6/2010
(Continued)

*Primary Examiner* — John Fox
(74) *Attorney, Agent, or Firm* — Harness, Dickey & Pierce, P.L.C.

(57) ABSTRACT

A blower fan includes a plurality of blades radially extending from a boss provided at the rotary center and spaced apart from each other in the rotational direction, and a ring portion connecting outer peripheral ends of the blades in a ring shape. An inner peripheral wall surface of an end part on an air-flow downstream side of a cylindrical portion is disposed on the outside in a radial direction of the rotary shaft in the blower fan, with respect to an end part on the air-flow downstream side of the ring portion. The end part on the air-flow downstream side of the cylindrical portion is positioned outward in the radial direction of the rotary shaft, as toward the air-flow downstream side. Thus, the blower can prevent the backflow air from being swirled, thereby reducing noise.

3 Claims, 6 Drawing Sheets

(51) Int. Cl.
    *F04D 29/16*     (2006.01)
    *B60H 1/00*     (2006.01)
    *F04D 25/08*     (2006.01)
    *F04D 29/54*     (2006.01)
    *F04D 19/00*     (2006.01)
    *F04D 29/32*     (2006.01)

(52) U.S. Cl.
    CPC ........... *F04D 25/08* (2013.01); *F04D 29/164* (2013.01); *F04D 29/326* (2013.01); *F04D 29/526* (2013.01); *F04D 29/541* (2013.01); *B60H 2001/006* (2013.01); *F05B 2240/33* (2013.01); *F05B 2260/96* (2013.01); *F05B 2280/6015* (2013.01)

(56) References Cited

U.S. PATENT DOCUMENTS

| | | | | |
|---|---|---|---|---|
| 5,423,660 | A | * | 6/1995 | Sortor ................. F01P 5/06 416/189 |
| 5,489,186 | A | * | 2/1996 | Yapp .................. F01D 5/141 415/208.3 |
| 9,850,914 | B2 | * | 12/2017 | Dreesen ............... F04D 29/164 |
| 2008/0075585 | A1 | | 3/2008 | Acre |
| 2011/0114286 | A1 | | 5/2011 | Komatsu et al. |

FOREIGN PATENT DOCUMENTS

| | | |
|---|---|---|
| JP | 2010222974 A | 10/2010 |
| WO | WO-2008074307 A1 | 6/2008 |

* cited by examiner though the entire region of the end part on the air-flow downstream side of the air outlet is positioned outward in the
BLOWER

CROSS REFERENCE TO RELATED APPLICATIONS

This application is a U.S. National Phase Application under 35 U.S.C. 371 of International Application No. PCT/JP2015/000805 filed on Feb. 20, 2015 and published in Japanese as WO 2015/125485 A1 on Aug. 27, 2015. This application is based on and claims the benefit of priority from Japanese Patent Application No. 2014-031516 filed on Feb. 21, 2014. The entire disclosures of all of the above applications are incorporated herein by reference.

FIELD OF THE INVENTION

The present disclosure relates to a blower that blows air to a heat exchanger, such as a radiator.

BACKGROUND ART

Conventionally, for example, a blower is known that includes an axial flow fan for supplying air to a radiator, and a shroud forming an air passage leading from the radiator to the axial flow fan while holding the axial flow fan (see, for example, Patent Document 1). In the blower such as that disclosed in Patent Document 1, the shroud has a bellmouth (cylindrical part) configured to cover the outer periphery of the axial flow fan, and a shroud plate portion (flat surface portion) connecting a space on the downstream side of the air flow in the radiator to the cylindrical part.

Related Art Document

Patent Document

[Patent Document 1] Japanese Unexamined Patent Application Publication No. 2010-132183

SUMMARY OF INVENTION

In recent years, a ring fan has been used as the axial flow fan for a blower from the viewpoint of improving the formability and strength. The ring fan includes a ring portion that annularly connects the outer peripheral ends of a plurality of blades. In the blower with such a ring fan, the bellmouth of the shroud is configured to be substantially in parallel to the ring portion. Alternatively, a part of the bellmouth on the air-flow downstream side is bent to cover the ring portion from the air-flow downstream side, causing the end on the air-flow downstream side of the ring portion to be opposed to the end of the bellmouth with respect to the air flow direction.

Based on the studies by the inventors of the present disclosure, in this kind of blower, the backflow air flowing into a gap between the ring portion of the axial flow fan and the bellmouth of the shroud (tip gap) interferes with the flow of blowout air blown from the axial flow fan, making it more likely to increase noise.

The present disclosure has been made in view of the foregoing matter, and it is an object of the present disclosure to provide a blower that can reduce noise.

A blower according to an aspect of the present disclosure includes: an axial flow blower fan that is rotatably driven to generate an airflow; and a shroud that is provided with a suction port through which air is drawn into the blower fan, and an air outlet through which air is drawn out of the blower fan. The blower fan includes a plurality of blades radially extending from a boss provided at a rotation center and spaced apart from each other in a rotational direction, and a ring portion connecting outer peripheral ends of the blades in a circumferential direction. In the blower, an inner peripheral wall surface of an end part on an air-flow downstream side of the air outlet is disposed on an outer side in a radial direction of a rotary shaft in the blower fan with respect to an end part on the air-flow downstream side of the ring portion, and the end part on the air-flow downstream side of the air outlet is positioned outward in the radial direction of the rotary shaft as toward the air-flow downstream side.

With the arrangement, the backflow air with respect to the blown-air flow (main stream) from the blower fan is more likely to flow into the clearance between the ring portion of the blower fan and the air outlet of the shroud. Thus, the backflow air from the blower fan is allowed to smoothly flow into a clearance from the outside in the radial direction of the rotary shaft of the blower fan, and thereby it can reduce noise due to interference between the blown air as the main flow and the backflow air from the blower fan.

The sentence "the end part on the air-flow downstream side of the air outlet is positioned outward in the radial direction of the rotary shaft as toward the air-flow downstream side" as used in the present disclosure means not only that the entire region of the end part on the air-flow downstream side of the air outlet is positioned outward in the radial direction of the rotary shaft toward the air-flow downstream side, but also that a part of the end part on the air-flow downstream side of the air outlet is positioned outward in the radial direction of the rotary shaft as toward the air-flow downstream side.

DESCRIPTION OF EMBODIMENTS

Figure 1:
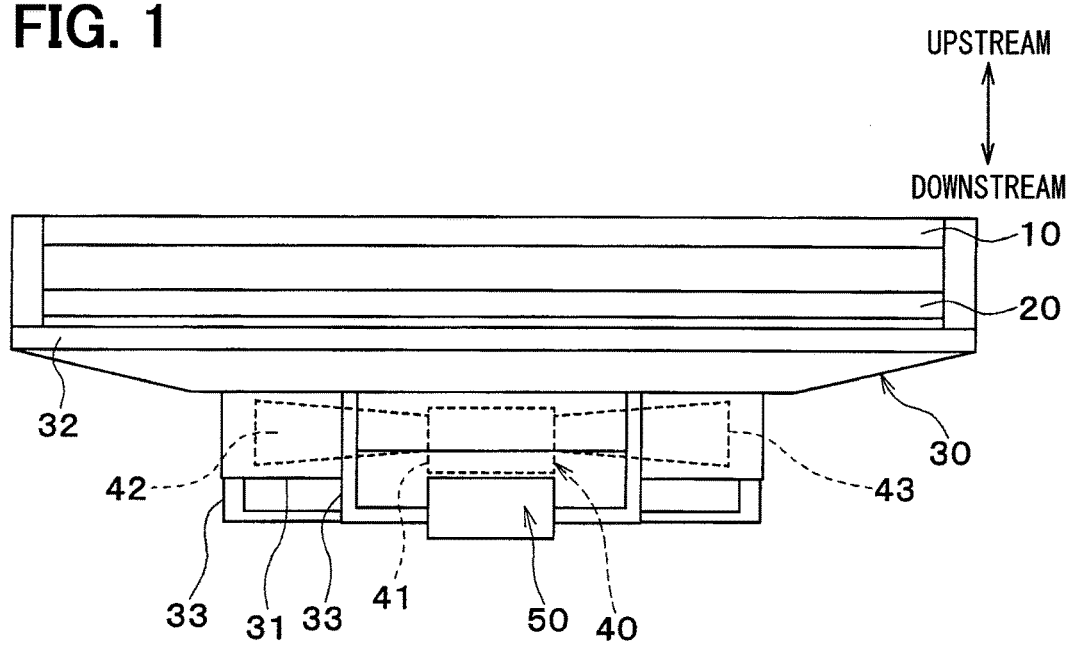
FIG. 1 is a plan view showing a blower according to a first embodiment.

In the following, embodiments of the present disclosure will be described with reference to the accompanying drawings. Note that in the respective embodiments below, the same or equivalent parts are indicated by the same reference characters throughout the figures.

First Embodiment

Figure 2:
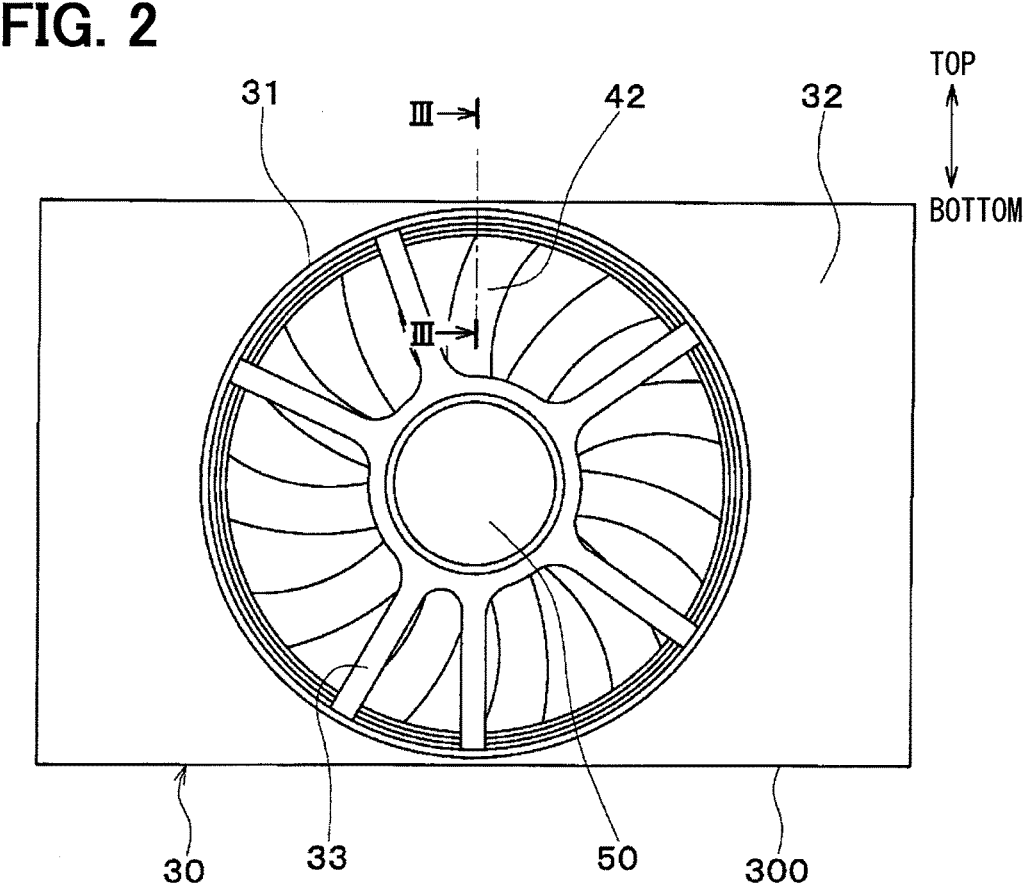
FIG. 2 is a front view of the blower in the first embodiment.
Figure 3:
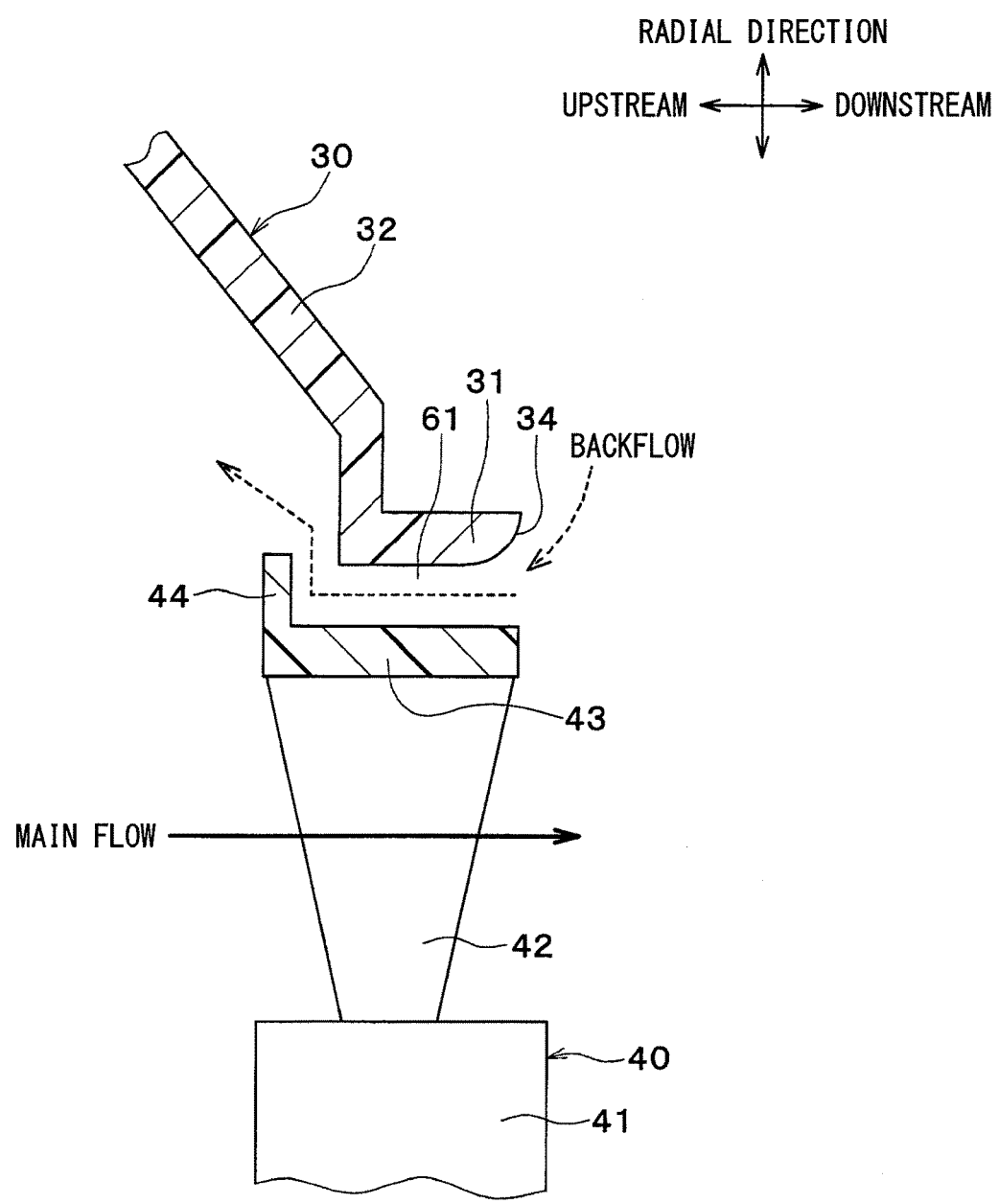
FIG. 3 is a cross-sectional view taken along the line III-III of FIG. 2.

A first embodiment of the present disclosure will be described with reference to the accompanying drawings. As illustrated in FIGS. 1, 2, and 3, a blower described in the embodiment is a blower to be used to cool a refrigerant heat radiation device 10 and a radiator 20 for an automobile. The blower includes a shroud 30, a blower fan 40, and a motor 50.

The refrigerant heat radiation device 10 is a heat exchanger that exchanges heat between the outside air and a refrigerant circulating through a refrigeration cycle (not shown) to thereby cool the refrigerant. The radiator 20 is a heat exchanger that exchanges heat between an engine coolant and the outside air to thereby cool the engine coolant. Each of the refrigerant heat radiation device 10 and the radiator 20 has its outer appearance formed in a rectangular shape (having a substantially oblong figure in the embodiment) in a planar view, that is, in a plane perpendicular to the air flow direction.

The refrigerant heat radiation device 10 is disposed at the vehicle front side, or upstream side of the air flow of the radiator 20. The refrigerant heat radiation device 10 and radiator 20 are coupled and integrated together.

The shroud 30, which is made of resin (e.g., glass fiber-filled polypropylene), is a component that serves to hold the motor 50 while guiding the airflow induced by the blower fan 40 to flow through the refrigerant heat radiation device 10 and the radiator 20. The shroud 30 is disposed at the vehicle rear side, or air-flow downstream side of the radiator 20.

The shroud 30 has a cylindrical portion 31 that is formed in a ring (cylindrical) shape while covering the outer periphery of the blower fan 40, and a plane portion 32 that connects a space on the air-flow downstream side of the radiator 20 to the cylindrical portion 31 by a smooth flow path. In the embodiment, the plane portion 32 forms a suction port of air to be drawn into the blower fan 40, and the cylindrical portion 31 forms an air outlet for blowing the air from the blower fan 40.

The plane portion 32 covers the backside of the radiator 20, that is, the surface on the vehicle rear side of the radiator 20. The plane portion 32 has a tubular shape to communicate with the cylindrical portion 31, and also communicates with the outside.

The cylindrical portion 31 has a circular planar shape. On the other hand, the shroud 30 has a rectangular planar shape. That is, an outer peripheral edge 300 of the shroud 30 has a rectangular planar shape. The area of an opening in the plane portion 32 is larger than that of an opening in the cylindrical portion 31.

The blower fan 40 is an axial-flow blower fan for blowing air and is configured to rotate about a rotary shaft. The blower fan 40 includes a plurality of blades 42 radially extending from a boss 41 provided at the rotation center and spaced apart from each other in the rotational direction, and a ring portion 43 connecting the outer peripheral ends of the blades 42 in a ring shape.

The blower fan 40 is disposed in a hollow part of the cylindrical portion 31 in the shroud 30. A clearance 61 is formed between the outer peripheral surface of the ring portion 43 and the inner peripheral surface of the cylindrical portion 31. Thus, the blower fan 40 is rotatable within the cylindrical portion 31 without contact with the cylindrical portion 31.

The length of the clearance 61 in a radial direction of the rotary shaft of the blower fan 40 (hereinafter simply referred to as the "rotary shaft"), that is, the length in the radial direction of the rotary shaft between the outer peripheral surface of the ring portion 43 and the inner peripheral surface of the cylindrical portion 31 is hereinafter defined as a gap height.

The motor 50 is an electric motor that provides the rotary power to the blower fan 40 and has a motor shaft (not shown). The motor 50 is supported by a plurality of motor stators 33 provided at the cylindrical portion 31 of the shroud 30. The motor 50 rotates the blower fan 40 by rotating the motor shaft, thereby generating airflow in a direction of axis of the blower fan 40, that is, in an axial direction of the rotary shaft. The entire structure of the blower has been described above.

Next, the detailed shapes of the cylindrical portion 31 of the shroud 30 and the blower fan 40 will be described.

As shown in FIG. 3, the end on the air-flow upstream side of the ring portion 43 is connected to a flange 44 extending toward the outside in the radial direction of the rotary shaft. The flange 44 is integrally formed with the ring portion 43.

The cylindrical portion 31 of the shroud 30 is formed substantially in parallel to a part (parallel part) of the ring portion 43 other than the flange 44. The inner peripheral wall surface of an end part 34 on the air-flow downstream side of the cylindrical portion 31 is disposed on the outer side in the radial direction of the rotary shaft, with respect to an end part on the air-flow downstream side of the ring portion 43 in the blower fan 40.

The end part 34 on the air-flow downstream side of the cylindrical portion 31 is positioned outward in the radial direction of the rotary shaft, as toward the air-flow downstream side. In other words, the end part 34 on the air-flow downstream side of the cylindrical portion 31 is configured such that a gap size between the end part 34 on the air-flow downstream side of the cylindrical portion 31 and the ring portion 43 is enlarged from the upstream side to downstream side of the air flow. That is, the end part 34 on the air-flow downstream side of the cylindrical portion 31 is curved in such a manner as to be spaced apart from the ring portion 43 from the upstream side to downstream side of the air flow.

In the embodiment, the end part 34 on the air-flow downstream side of the cylindrical portion 31 is formed to have an arc cross-section that protrudes inward in the radial direction of the rotary shaft.

As mentioned above, in the embodiment, the inner peripheral wall surface of the end part 34 on the air-flow downstream side of the cylindrical portion 31 is disposed outside the rotary shaft in the radial direction with respect to the end part on the air-flow downstream side of the ring portion 43, while the end part 34 on the air-flow downstream side of the cylindrical portion 31 is positioned outward in the radial direction of the rotary shaft, as toward the air-flow downstream side. Thus, the backflow air with respect to the blown-air flow (main stream) from the blower fan 40 is more likely to flow into the clearance 61 between the ring portion 43 of the blower fan 40 and the cylindrical portion 31 of the shroud 30. That is, the main flow and the backflow from the blower fan 40 are positively separated from each other. Thus, the backflow air from the blower fan 40 can flow into the clearance 61 from the outside in the radial direction of the rotary shaft of the blower fan 40, which can reduce noise that would otherwise be caused by interruption between the blown air as the main flow from the blower fan 40 and the backflow air therefrom.

Accordingly, the embodiment can suppress the interruption between the main flow and the backflow from the blower fan 40 as mentioned above, and thus can also improve the flow of the blown air as the main flow.

Second Embodiment

Next, a second embodiment of the present disclosure will be described based on FIG. 4. In the second embodiment, the shape of the end part 34 on the air-flow downstream side of the cylindrical portion 31 is changed, compared to that in the above-mentioned first embodiment.

Figure 4:
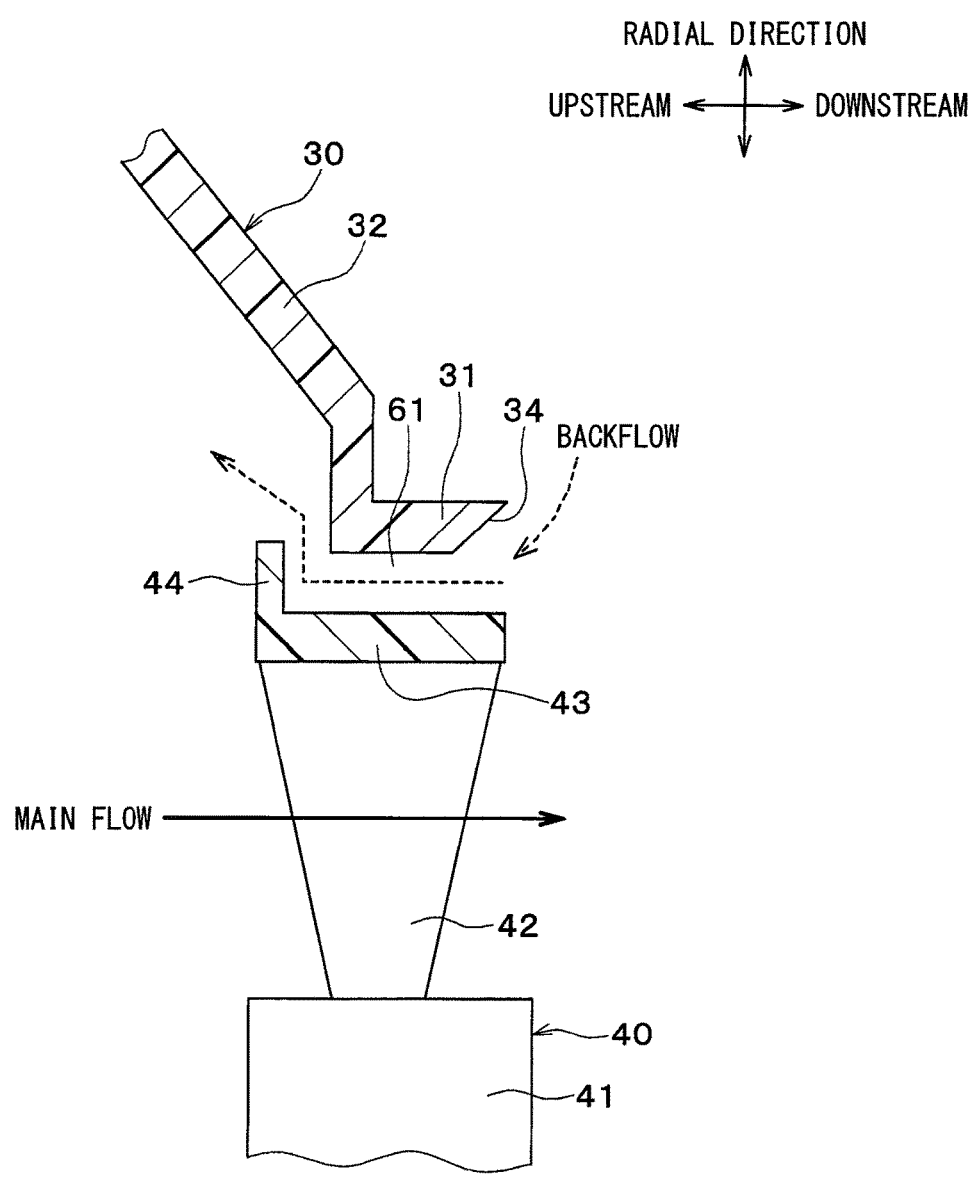
FIG. 4 is a cross-sectional view showing a part of a blower according to a second embodiment.

As shown in FIG. 4, in the second embodiment, the end part 34 on the air-flow downstream side of the cylindrical portion 31 is linearly inclined outward in the radial direction of the rotary shaft, toward the air-flow downstream side. That is, the end part 34 on the air-flow downstream side of the cylindrical portion 31 is linearly inclined in such a manner that a gap size between the end part 34 on the air-flow downstream side of the cylindrical portion 31 and the ring portion 43 is enlarged from the upstream side to downstream side of the air flow. In the embodiment, the backflow air of the blower fan 40 can easily flow into the clearance 61 between the ring portion 43 of the blower fan 40 and the cylindrical portion 31 of the shroud 30, which can obtain the same effects as those of the first embodiment described above.

Third Embodiment

Next, a third embodiment of the present disclosure will be described based on FIG. 5. In the third embodiment, the shape of the end part 34 on the air-flow downstream side of the cylindrical portion 31 is changed, compared to that in the above-mentioned first embodiment.

Figure 5:
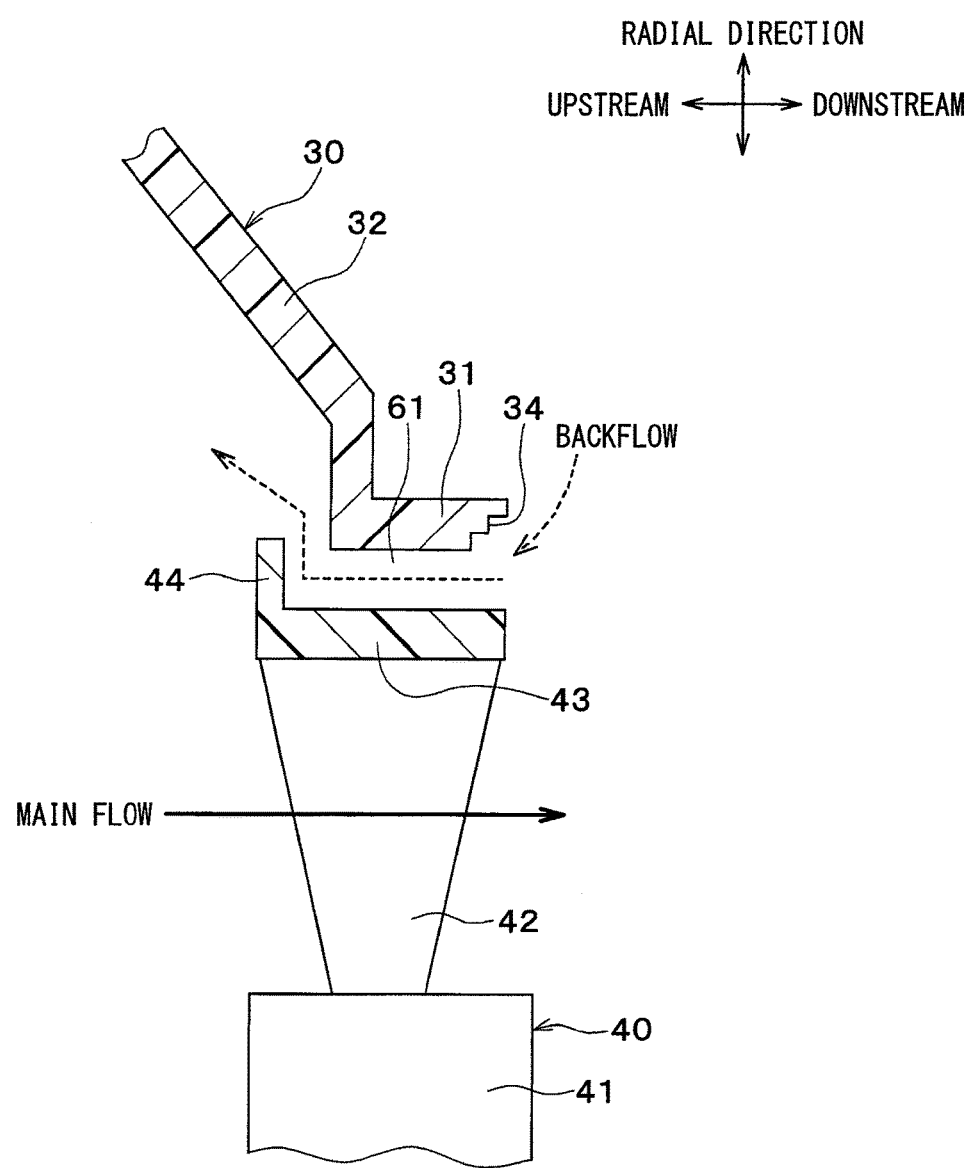
FIG. 5 is a cross-sectional view showing a part of a blower according to a third embodiment.

As shown in FIG. 5, in the third embodiment, the end part 34 on the air-flow downstream side of the cylindrical portion 31 has its cross-section formed with a stepped shape such that the end part 34 is spaced apart from the ring portion 43 in a stepwise manner from the upstream side to downstream side of the air flow. That is, the end part 34 on the air-flow downstream side of the cylindrical portion 31 is configured in such a manner as to enlarge the gap size in a stepwise manner from the upstream side to downstream side of the air flow.

In the embodiment, the backflow air of the blower fan 40 easily flows into the clearance 61 between the ring portion 43 of the blower fan 40 and the cylindrical portion 31 of the shroud 30, which can obtain the same effects as those of the first embodiment described above.

Other Embodiments

The present disclosure is not limited to the above-mentioned embodiments, and various modifications and changes can be made to these embodiments without departing from the scope and spirit of the present disclosure.

Figure 6:
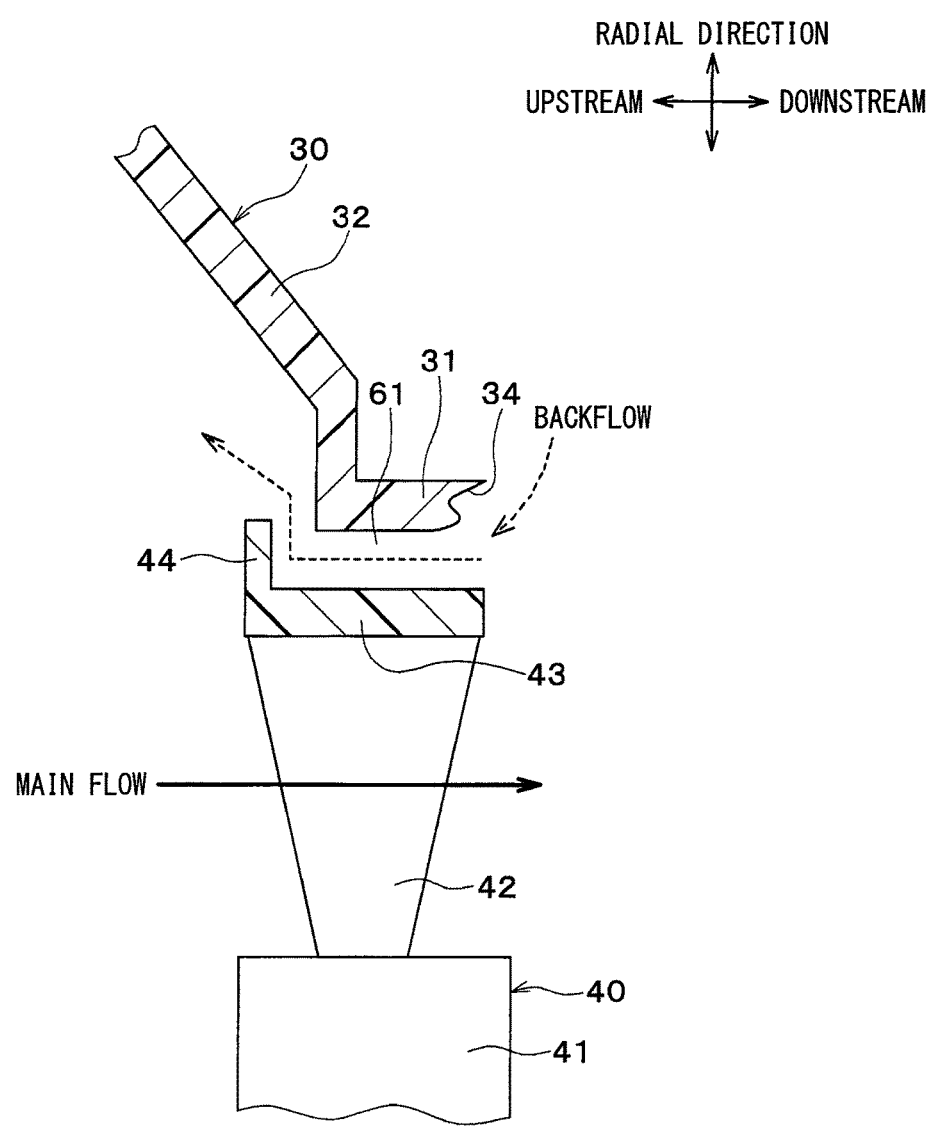
FIG. 6 is a cross-sectional view showing a part of a blower according to an another embodiment (1).

(1) In each of the above-mentioned embodiments, the entire region of the end part 34 on the air-flow downstream side of the cylindrical portion 31 of the shroud 30 is positioned outward in the radial direction of the rotary shaft, as toward the air-blow downstream side, as described by way of example. However, the embodiments are not limited thereto. For example, as shown in FIG. 6, a part of the end part 34 on the air-flow downstream side of the cylindrical portion 31 may be positioned outward in the radial direction of the rotary shaft, as toward the air-flow downstream side.

Figure 7:
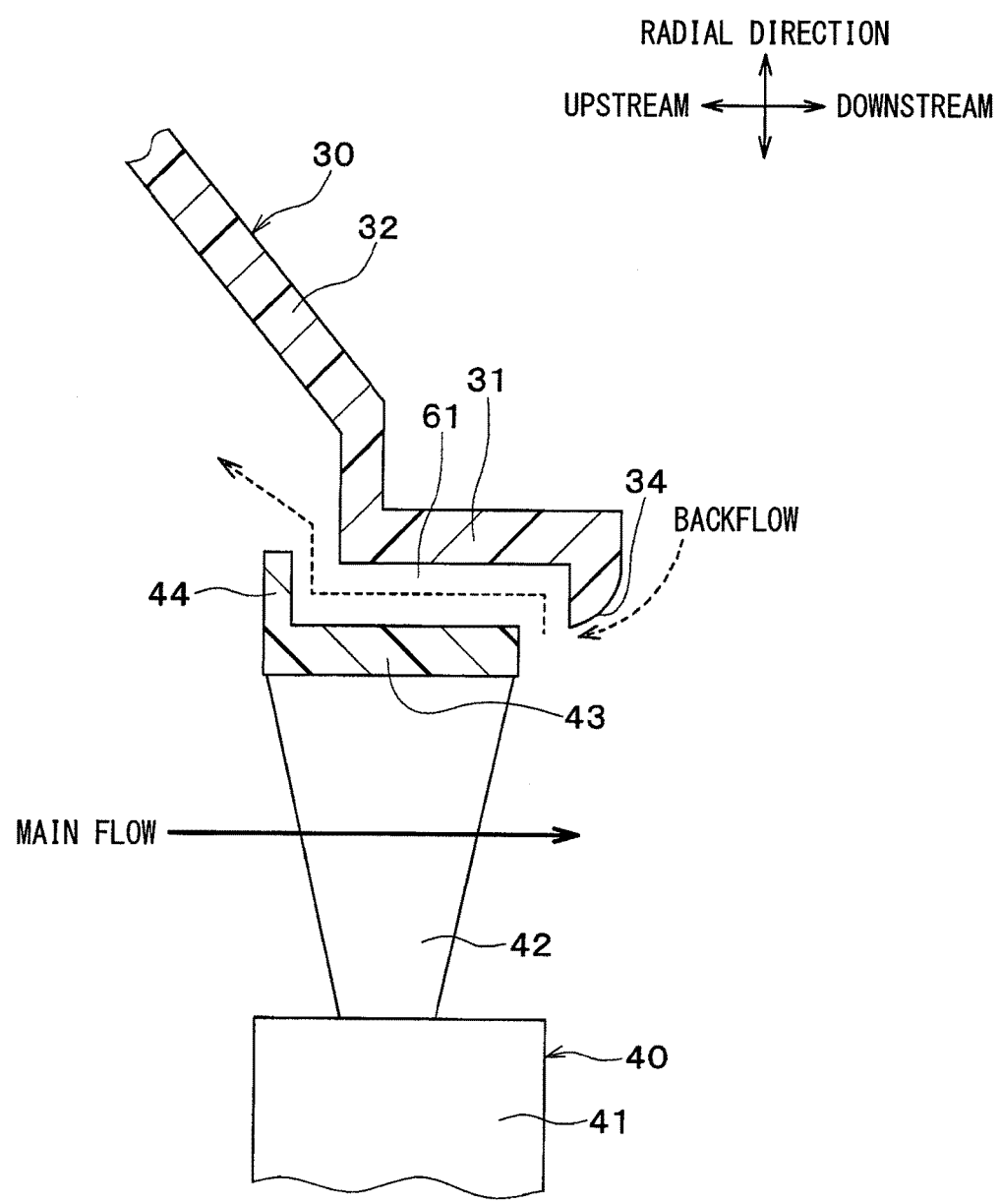
FIG. 7 is a cross-sectional view showing a part of a blower according to a further another embodiment (2).

(2) In each of the above-mentioned embodiments, the inner peripheral wall surface of the end part 34 on the air-flow downstream side of the cylindrical portion 31 is disposed on the outer side in the radial direction of the rotary shaft with respect to the end part on the air-flow downstream side of the ring portion 43 in the blower fan 40 as described by way of example. However, the embodiments are not limited thereto. For example, as shown in FIG. 7, the inner peripheral wall surface of the end part 34 on the air-flow downstream side of the cylindrical portion 31 may be positioned to be superimposed over the end part on the air-flow downstream side of the ring portion 43 as viewed from the air flow direction.

(3) The above-mentioned respective embodiments may be combined together within the feasible range as appropriate.

(4) In each of the above-mentioned embodiments, the blower of the present disclosure is configured as a blower that is used to cool the refrigerant heat radiation device 10 and radiator 20 in automobiles as mentioned above, which is just an example. That is, the blower is not limited to the structure described above, and can have other structures that enable achievement of the present disclosure. For example, the blower may have a structure including at least the shroud 30 and the blower fan 40.

What is claimed is:

1. A blower comprising:
an axial flow blower fan that is rotatably driven to generate an airflow; and
a shroud provided with a suction port through which air is drawn into the blower fan, and an air outlet through which air is blown out of the blower fan,
the blower fan including:
a plurality of blades radially extending from a boss provided at a rotation center and spaced apart from each other in a rotational direction; and
a ring portion connecting outer peripheral ends of the blades in a circumferential direction, wherein
an inner peripheral wall surface of an end part on an air-flow downstream side of the air outlet is disposed on an outer side in a radial direction of the ring portion in the blower fan, with respect to an end part on the air-flow downstream side of the ring portion,
the end part on the air-flow downstream side of the air outlet is positioned outward in the radial direction of the ring portion, as toward the air-flow downstream side, and
the end part on the air-flow downstream side of the air outlet is curved and smoothly protruded toward an inner side in the radial direction of the ring portion.

2. The blower according to claim 1, wherein
an inner peripheral wall surface of the end part on the air-flow downstream side of the air outlet is overlap with the end part on the air-flow downstream side of the ring portion in an air flow direction.

3. The blower according to claim 1, wherein
the blower fan is disposed to form a clearance between the air outlet of the shroud and the ring portion of the blower fan, and
the ring portion is provided substantially in parallel to the air outlet.

* * * * *